United States Patent
Zhang et al.

(10) Patent No.: US 10,459,252 B2
(45) Date of Patent: Oct. 29, 2019

(54) APPARATUS AND METHOD FOR PROTECTING A USER FROM BLUE LIGHT RADIATION

(71) Applicant: BOE TECHNOLOGY GROUP CO., LTD., Beijing (CN)

(72) Inventors: Lijie Zhang, Beijing (CN); Zhenglong Li, Beijing (CN); Xuewen Lv, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 302 days.

(21) Appl. No.: 15/519,630

(22) PCT Filed: Oct. 26, 2016

(86) PCT No.: PCT/CN2016/103333
§ 371 (c)(1),
(2) Date: Apr. 17, 2017

(87) PCT Pub. No.: WO2017/088622
PCT Pub. Date: Jun. 1, 2017

(65) Prior Publication Data
US 2017/0357106 A1    Dec. 14, 2017

(30) Foreign Application Priority Data
Nov. 24, 2015   (CN) .......................... 2015 1 0824974

(51) Int. Cl.
G02C 7/10   (2006.01)
G01J 1/16   (2006.01)
G02C 11/00  (2006.01)

(52) U.S. Cl.
CPC ............... *G02C 7/101* (2013.01); *G01J 1/16* (2013.01); *G02C 11/10* (2013.01)

(58) Field of Classification Search
CPC . G02C 11/10; G02C 7/02; G02C 7/10; G02C 7/101; G02C 7/102; G02C 7/104;
(Continued)

(56) References Cited

U.S. PATENT DOCUMENTS

2005/0043793 A1   2/2005  Pratt
2015/0277003 A1   10/2015 Sanchez Ramos
(Continued)

FOREIGN PATENT DOCUMENTS

CN    104111111 A    10/2014
CN    104936507 A     9/2015
(Continued)

OTHER PUBLICATIONS

Search Report in the Chinese Patent Application No. 201510824974.6, dated May 4, 2016; English translation attached.
(Continued)

*Primary Examiner* — William R Alexander
*Assistant Examiner* — Henry A Duong
(74) *Attorney, Agent, or Firm* — Intellectual Valley Law, P.C.

(57) ABSTRACT

The present application discloses an apparatus for protecting a user's eye from blue light radiation, the apparatus includes a radiation detector configured to convert blue light from a light source into a photo voltage having a voltage value; a processor coupled to the radiation detector and configured to calculate a cumulative radiation intensity based on the voltage value cumulated over a time interval, and to compare the cumulative radiation intensity with a threshold value; and a controller coupled to the processor, configured to adjustably control blocking of at least a portion of blue light from the user's eye when the cumulative radiation intensity exceeds the threshold value.

18 Claims, 7 Drawing Sheets

(58) Field of Classification Search
CPC ........ G02C 7/105; G02C 7/107; G02C 7/108; G01J 1/16
USPC .................................................. 351/159.65
See application file for complete search history.

(56) References Cited

U.S. PATENT DOCUMENTS

2015/0342457 A1* 12/2015 Sanchez Ramos ..... G01J 1/429
                                                  600/476
2017/0038605 A1*  2/2017 Legerton .................. G02C 7/02

FOREIGN PATENT DOCUMENTS

| CN | 205144852 U | 4/2016 |
| KR | 20150095939 A | 8/2015 |
| WO | 2015155748 A1 | 10/2015 |

OTHER PUBLICATIONS

Notification of Reason for Refusal in the Korean Patent Application No. 20177009926, dated Jan. 15, 2018; English translation attached.
International Search Report & Written Opinion dated Jan. 26, 2017 regarding PCT/CN2016/103333.
First Office Action in the Chinese Patent Application No. 201510824974.6, dated Aug. 16, 2016; English translation attached.
Second Office Action in the Chinese Patent Application No. 201510824974.6, dated Dec. 20, 2016; English translation attached.
Notification to Grant Patent Right for Invention in the Chinese Patent Application No. 201510824974.6, dated Mar. 31, 2017; English translation attached.

* cited by examiner

APPARATUS AND METHOD FOR PROTECTING A USER FROM BLUE LIGHT RADIATION

CROSS-REFERENCE TO RELATED APPLICATION

This application is a national stage application under 35 U.S.C. § 371 of International Application No. PCT/CN2016/103333 filed Oct. 26, 2015, which claims priority to Chinese Patent Application No. 201510824974.6, filed Nov. 24, 2015, the contents of which are incorporated by reference in the entirety.

TECHNICAL FIELD

The present invention relates to a field of displaying, more particularly, to an apparatus for protecting a user's eye from blue light radiation, a wearable apparatus and a display apparatus having the same, and a protection method thereof.

BACKGROUND

In the visible light spectrum, blue light is a high energy visible light having a short wavelength. Blue light is more scattered in the atmosphere than other wavelengths of the visible light. For example, a clear sky appears blue to human eyes. In a modern society, blue light is also emitted from many natural and artificial light sources such as a display apparatus, an energy-saving light bulb, LEDs, an incandescent light bulb, and sunlight. Due to its high energy level, blue light can easily penetrate lens of the eye and reach the retina. Moreover, blue light has a cumulative effect on the retina. Human eye's self-defense mechanism becomes less efficient over the years under the blue light exposure. Exposure to high intensity blue light over an extended period of time can accelerate oxidation process in macular area of the eye, causing substantial damages in the eye.

SUMMARY

In one aspect, the present invention provides an apparatus for protecting a user's eye from blue light radiation, comprising a radiation detector configured to convert blue light from a light source into a photo voltage having a voltage value; a processor coupled to the radiation detector and configured to calculate a cumulative radiation intensity based on the voltage value cumulated over a time interval, and to compare the cumulative radiation intensity with a threshold value; and a controller coupled to the processor, configured to adjustably control blocking of at least a portion of blue light from the user's eye when the cumulative radiation intensity exceeds the threshold value.

Optionally, the apparatus further comprises an electrochromic layer configured to adjustably block at least a portion of blue light from the user's eye when the cumulative radiation intensity exceeds the threshold value; wherein the controller is coupled to the processor and the electrochromic layer configured to adjustably control a degree of blue light blocking of the electrochromic layer between a first light blocking degree, and a second light blocking degree higher than the first light blocking degree.

Optionally, the processor comprises an accumulator configured to perform cumulative processing of the voltage value over the time interval; a calculator configured to calculate the cumulative radiation intensity based on the voltage value cumulated over the time interval; and a comparator configured to compare the cumulative radiation intensity with the threshold value.

Optionally, the radiation detector comprises a light sensor configured to selectively convert blue light having a wavelength in a range of approximately 400 nm to approximately 500 nm into the photo voltage.

Optionally, the apparatus further comprises an alarm configured to generate an alarm signal when the cumulative radiation intensity increases from a first value to a second value, wherein the second value is greater than the threshold value and the first value is less than or equal to the threshold value.

Optionally, the apparatus further comprises an angle detector; wherein the apparatus is an eye wearable apparatus wearable on an eye region of a user; the angle detector is configured to detect an angle of incidence of the blue light received at a location of the electrochromic layer corresponding to a maximum photo voltage detected by the radiation detector; the processor is configured to generate an adjustment value based on a product of a first factor associated with a voltage value of the maximum photo voltage and a second factor associated with the angle of incidence; and the controller is configured to adjust the degree of blue light blocking of the electrochromic layer based on the adjustment value.

Optionally, the apparatus further comprises a location detector and a rangefinder; wherein the electrochromic layer is a component of a display apparatus; the location detector is configured to detect a location of the electrochromic layer corresponding to a maximum photo voltage detected by the radiation detector; the rangefinder is configured to detect a distance between the location and the user; the processor is configured to generate an adjustment value based on a sum of a first factor associated with a voltage value of the maximum photo voltage and a second factor associated with the distance; and the controller is configured to adjust the degree of blue light blocking of the electrochromic layer based on the adjustment value.

Optionally, the apparatus further comprises a location detector and a rangefinder; wherein the electrochromic layer is a component of a display apparatus; the location detector is configured to detect a location of the electrochromic layer corresponding to a maximum photo voltage detected by the radiation detector and detect an angle of exit of the blue light at the location of the electrochromic layer corresponding to the maximum photo voltage; the rangefinder is configured to detect a distance from the location to the user; the processor is configured to generate an adjustment value based on a sum of a first factor associated with the distance; and a product of a second factor associated with a voltage value of the maximum photo voltage and a third factor associated with the angle of exit; and the controller is configured to adjust the degree of blue light blocking of the electrochromic layer based on the adjustment value.

Optionally, the electrochromic layer is controlled to have the first light blocking degree when the cumulative radiation intensity decreases from a first value to a second value, wherein the second value is smaller than or equal to the threshold value.

Optionally, the apparatus further comprises a monitor configured to determine if the user is within a distance relative to the light source when a time period starting from a time point when the alarm signal is generated lapses; wherein the degree of blue light blocking of the electrochromic layer is controlled to be greater than the first light blocking degree if the user is within the distance when the time period lapses.

Optionally, the first light blocking degree corresponds to a state of the electrochromic layer in which no voltage is applied to the electrochromic layer.

In another aspect, the present invention provides a wearable apparatus, comprising the apparatus described herein.

In another aspect, the present invention provides a display apparatus comprising the apparatus described herein.

In another aspect, the present invention provides a method of protecting a user's eye from blue light radiation, comprising converting blue light from a light source into a photo voltage having a voltage value; calculating a cumulative radiation intensity based on the voltage value cumulated over a time interval; comparing the cumulative radiation intensity with a threshold value; and adjustably blocking at least a portion of blue light from the user's eye when the cumulative radiation intensity exceeds the threshold value.

Optionally, adjustably blocking at least a portion of blue light is performed by controlling a degree of blue light blocking of an electrochromic layer between a first light blocking degree and a second light blocking degree.

Optionally, the step of converting blue light comprises selectively converting blue light having a wavelength in a range of approximately 400 nm to approximately 500 nm into the photo voltage.

Optionally, the method further comprises generating an alarm signal when the cumulative radiation intensity increases from a first value to a second value, wherein the second value is greater than the threshold value and the first value is less than or equal to the threshold value.

Optionally, the method further comprises determining if the user is within a distance relative to the light source when a time period starting from a time point when the alarm signal is generated lapses; and blocking at least a portion of blue light from the user's eye if the user is within the distance when the time period lapses.

Optionally, the step of converting blue light is performed in an eye wearable apparatus having the electrochromic layer as a component; the method further comprises determining a location of the electrochromic layer corresponding to a maximum photo voltage having a corresponding voltage value; detecting an angle of incidence of blue light received at the location; generating an adjustment value based on a product of a first factor associated with a voltage value of the maximum photo voltage and a second factor associated with the angle of incidence; and adjusting a degree of blue light blocking based on the adjustment value.

Optionally, the step of converting blue light is performed in a display apparatus having the electrochromic layer as a component; the method further comprises determining a location of the electrochromic layer corresponding to a maximum photo voltage having a voltage value; detecting a distance between the location and the user; generating an adjustment value based on a product of a first factor associated with the voltage value and a second factor associated with the angle of outgoing blue light; and adjusting a degree of blue light blocking based on the adjustment value.

Optionally, the step of converting blue light is performed in a display apparatus having the electrochromic layer as a component; the method further comprises determining a location of the electrochromic layer corresponding to a maximum photo voltage detected; detecting an angle of exit of the blue light at the location of the electrochromic layer corresponding to the maximum photo voltage; detecting a distance between the location and the user; generating an adjustment value based on a sum of a first factor associated with the distance; and a product of a second factor associated with a voltage value of the maximum photo voltage and a third factor associated with the angle of outgoing blue light; and; adjusting a degree of blue light blocking based on the adjustment value.

Optionally, the method further comprises controlling the electrochromic layer to have the first light blocking state when the cumulative radiation intensity decreases from a first value to a second value, wherein the second value is smaller than or equal to the threshold value.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present invention provides, inter alia, a touch substrate, an apparatus for protecting a user's eye from blue light radiation, a wearable apparatus and a display apparatus having the same, and a protection method thereof that substantially obviate one or more of the problems due to limitations and disadvantages of the related art. In one aspect, the present invention provides an apparatus for protecting a user's eye from blue light radiation. The apparatus may be a component of a display apparatus (e.g., a screen). Optionally, the apparatus is a component of a wearable apparatus for protecting eyes (e.g., a goggle). In some embodiments, the apparatus includes a radiation detector configured to convert blue light from a light source into a photo voltage having a voltage value; a processor coupled to the radiation detector and configured to calculate a cumulative radiation intensity based on the voltage value cumulated over a time interval, and to compare the cumulative radiation intensity with a threshold value; and a controller coupled to the processor, configured to adjustably control blocking of at least a portion of blue light from the user's eye when the cumulative radiation intensity exceeds the threshold value. Optionally, the apparatus further includes an electrochromic layer configured to adjustably block at least a portion of blue light from the user's eye when the cumulative radiation intensity exceeds the threshold value; wherein the controller is coupled to the processor and the electrochromic layer configured to adjustably control a degree of blue light blocking of the electrochromic layer between a first light blocking degree, and a second light blocking degree higher than the first light blocking degree. In some embodiments, the apparatus includes a radiation detector configured to convert blue light from a light source into a photo current; a processor coupled to the radiation detector and configured to convert the photo current into a voltage having a voltage value, to calculate a cumulative radiation intensity based on the voltage value cumulated over a time interval, and to compare the cumulative radiation intensity with a threshold value; and a controller coupled to the processor, configured to adjustably control blocking of at least a portion of blue light from the user's eye when the cumulative radiation intensity exceeds the threshold value. Optionally, the apparatus further includes an electrochromic layer configured to adjustably block at least a portion of blue light from the user's eye when the cumulative radiation intensity exceeds the threshold value; wherein the controller coupled to the processor and the electrochromic layer configured to control a degree of blue light blocking of the electrochromic layer between a first light blocking degree and a second light blocking degree higher than the first light blocking degree.

The first light blocking degree corresponds to a first light blocking state of the electrochromic layer, and the second light blocking state corresponds to a second light blocking state of the electrochromic layer. The electrochromic layer has a higher degree of blue light blocking in the second light blocking state than in the first light blocking state. Optionally, the first light blocking state is a state in which no voltage signal is applied to the electrochromic layer. Optionally, the first light blocking state is a state in which the blue light is substantially not blocked by the electrochromic layer. Optionally, the second light blocking degree is the maximum light blocking degree that can be achieved in the electrochromic layer. Optionally, the first light blocking state is a state in which a first voltage signal is applied to the electrochromic layer, and the second light blocking state is a state in which a second voltage signal is applied to the electrochromic layer.

In some embodiments, the degree of light blocking of the apparatus is adjustable between the first light blocking degree and the second light blocking degree, e.g., the degree of light blocking of the apparatus may be adjusted to be any value between the first light blocking degree and the second light blocking degree. Optionally, the degree of light blocking of the apparatus may be adjusted to one of a set of preselected light blocking degrees, e.g., one of 2, 5, 10, preselected light blocking degrees.

Figure 1A:
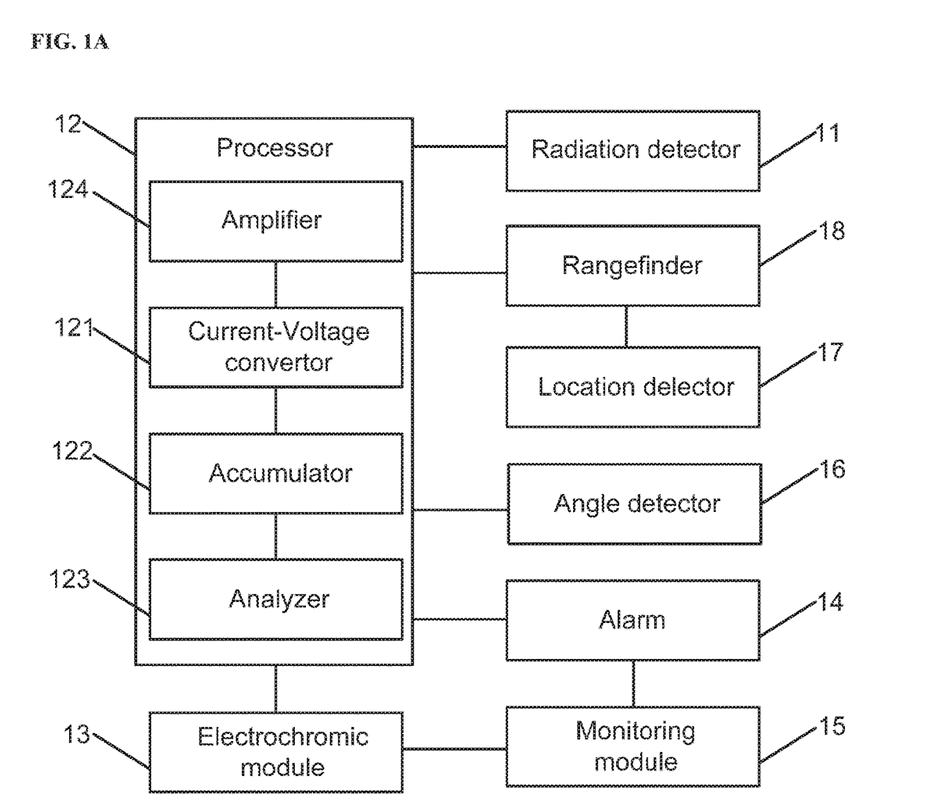
FIG. 1A is a simplified block diagram of a protection apparatus for blue light radiation according to some embodiments.

FIG. 1A is a simplified block diagram of a protection apparatus for blue light radiation according to some embodiments. Referring to FIG. 1A, the protection apparatus is for protecting a user from blue light radiation. The protection apparatus includes at least a radiation detector 11, a processor 12, and an electrochromic module 13. Optionally, the electrochromic module 13 includes an electrochromic layer, and a controller for controlling a degree of blue light blocking of the electrochromic layer. Optionally, the controller controls the electrochromic layer through, e.g., a pair of electrodes.

The radiation detector 11 is configured to detect a photo current originated from the blue light coming out of any light source, e.g., display apparatuses, energy-saving light bulbs, LEDs, and old-fashioned incandescent light bulbs and the sunlight. In some embodiments, the radiation detector 11 includes a light sensor capable of converting light into an electric current. Optionally, the light sensor is a photodetector including a photodiode with a PN junction or a photo transistor having an amplifying photodiode. Optionally, the light sensor has its primed absorption responsive wavelengths set in a range of 400 nm to 500 nm, which corresponds to a typical blue light spectrum. When the light sensor is illuminated by the blue light (e.g., blue light with wavelengths in the above range), a voltage is generated and its value changes as the light intensity increases. Through the photoelectric conversion process, the radiation detector is able to collect a photo current of the blue light.

Referring to FIG. 1A, the processor 11 is configured to convert the photo current to a voltage having a voltage value, and to process the voltage value by performing a cumulative calculation to obtain a cumulative radiation intensity over a predetermined sampling time interval (e.g., starting from a time point when the radiation detector starts detecting blue light radiation by recording the photo current into a memory of the processor). In some embodiments, the processor 11 is a data processor configured to collect, manipulate, and analyze a plurality of data based on various pre-loaded algorithms or preset parameters to produce meaningful information, and an information processor configured to change (or process) information in any manner detectable by a monitor or an observer. The processor can have a build-in timer to count the time from a starting point to an end of the predetermined sampling time interval for performing the cumulative calculation. The result of the cumulative calculation, i.e., a cumulative radiation intensity, can be stored in a flash memory associated with the processor 11. After obtaining the cumulative radiation intensity, the timer can be reset to zero and ready for next cumulative calculation with a next starting point being decided by the processor. For example, the next starting point can be triggered by different signals such as an alarm event, a monitoring result, or other events or operations. Moreover, the processor 11 is configured to analyze the result of the cumulative calculation and determine if the cumulative radiation intensity is greater than a threshold value of blue light radiation. This threshold value is a predetermined value on the radiation damage to human body and particularly to eyes. In the context of the present disclosure, cumulative radiation intensity refers to a value obtained from the result of cumulative calculation over a predetermined sampling time interval.

Referring again to FIG. 1A, when the processor 11 determines that the cumulative radiation intensity exceeds the threshold value, the electrochromic module 13 is configured to enable a protection layer (e.g., an electrochromic controlled by one or more electrodes) disposed between the light source of blue light and the user to at least partially block the blue light radiation. In some embodiments, the processor 11 is capable of amplifying the photo current collected by the light sensor, and converting the amplified current to a voltage having a voltage value. In some embodiments, the protection layer is made by an electrochromic material that reversibly changes color by using bursts of charge to cause electrochemical redox reactions therein. By changing color, the protection layer is able to cause a change in reflection and transmission coefficients thereby at least partial blocking of the radiation of selected wavelength, e.g., blue light. For example, transition metal oxides are a large family of materials possessing various interesting properties in the field of electrochromism. Among them, tungsten oxide ($WO_3$), has been the most extensively studied material. Examples of electrochromic materials include, but are not limited to, transition metal oxides such as $WO_3$, $MoO_3$, $Nb_2O_3$, and organic electrochromic materials such as pyridine, aminoquinone and azine compounds.

Figure 1B:
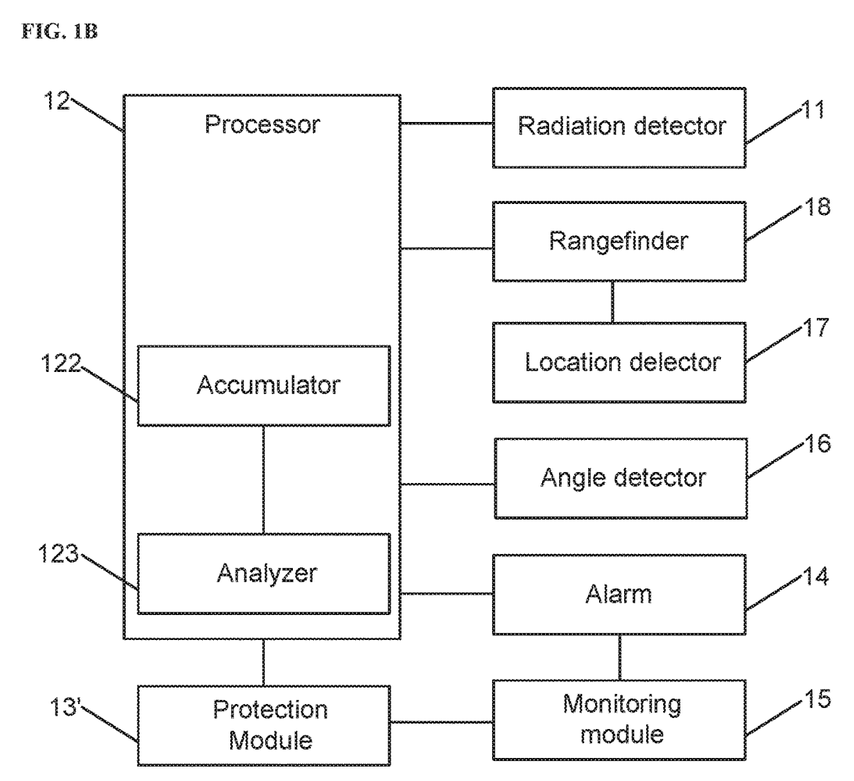
FIG. 1B is a simplified block diagram of a protection apparatus for blue light radiation according to some embodiments.

FIG. 1B is a simplified block diagram of a protection apparatus for blue light radiation according to some embodiments. Referring to FIG. 1B, the radiation detector 11 is configured to convert blue light from a light source into a photo voltage having a voltage value. For example, the radiation detector 11 may include a light sensor capable of converting light into a photo voltage. Optionally, the light sensor is a photodetector including a photodiode with a PN junction or a photo transistor having an amplifying photodiode. Optionally, the light sensor has its primed absorption responsive wavelengths set in a range of 400 nm to 500 nm, which corresponds to a typical blue light spectrum. When the light sensor is illuminated by the blue light (e.g., blue light with wavelengths in the above range), a voltage is generated and its value changes as the light intensity increases.

Referring to FIG. 1B, the processor 11 is configured to process the voltage value by performing a cumulative calculation to obtain a cumulative radiation intensity over a predetermined sampling time interval (e.g., starting from a time point when the radiation detector starts detecting blue light radiation by recording the photo voltage into a memory of the processor). In some embodiments, the processor 11 is a data processor configured to collect, manipulate, and analyze a plurality of data based on various pre-loaded algorithms or preset parameters to produce meaningful information, and an information processor configured to change (or process) information in any manner detectable by a monitor or an observer. The processor can have a build-in timer to count the time from a starting point to an end of the predetermined sampling time interval for performing the cumulative calculation. The result of the cumulative calculation, i.e., a cumulative radiation intensity, can be stored in a flash memory associated with the processor 11. After obtaining the cumulative radiation intensity, the timer can be reset to zero and ready for next cumulative calculation with a next starting point being decided by the processor. For example, the next starting point can be triggered by different signals such as an alarm event, a monitoring result, or other events or operations. Moreover, the processor 11 is configured to analyze the result of the cumulative calculation and determine if the cumulative radiation intensity is greater than a threshold value of blue light radiation. This threshold value is a predetermined value on the radiation damage to human body and particularly to eyes. In the context of the present disclosure, cumulative radiation intensity refers to a value obtained from the result of cumulative calculation over a predetermined sampling time interval.

Referring again to FIG. 1B, when the processor 11 determines that the cumulative radiation intensity exceeds the threshold value, the protection module 13' is configured to adjustably control blocking of at least a portion of blue light from the user's eye, and adjustably block at least a portion of blue light from the user's eye. Various types of protection module 13' may be used, including mechanical, electrical, optical, and optoelectronics types of protection mechanisms. In one example, the protection module 13' includes a protection film disposed between the light source of blue light and the user to at least partially block the blue light radiation, and a controller (e.g., a mechanical mechanism that slidably moves the protection film) for controlling the protection film. In another example, the protection module 13' includes an electrochromic layer controlled by one or more electrodes disposed between the light source of blue light and the user to at least partially block the blue light radiation, and a controller (e.g., one or more electrodes). In some embodiments, the protection layer is made by an electrochromic material that reversibly changes color by using bursts of charge to cause electrochemical redox reactions therein. By changing color, the protection layer is able to cause a change in reflection and transmission coefficients thereby at least partial blocking of the radiation of selected wavelength, e.g., blue light. For example, transition metal oxides are a large family of materials possessing various interesting properties in the field of electrochromism. Among them, tungsten oxide ($WO_3$), has been the most extensively studied material. Examples of electrochromic materials include, but are not limited to, transition metal oxides such as $WO_3$, $MoO_3$, $Nb_2O_3$, and organic electrochromic materials such as pyridine, aminoquinone and azine compounds.

In some embodiments, the protection apparatus for protecting a user from blue light radiation is provided as a wearable apparatus. Optionally, the wearable apparatus is a wearable apparatus wearable around an eye region of a user, e.g., an eye wearable apparatus. Optionally, the protection layer is a component of the wearable apparatus. For example, the protection layer associated with the electrochromic module within the protection apparatus can be a lens itself or a coating layer overlying the lens in the wearable apparatus. In some embodiments, the protection apparatus for protecting a user from blue light radiation is provided with a display apparatus. In particular, the protection layer associated with the electrochromic module of the protection apparatus can be disposed on the screen of the display apparatus. When the protection layer based on an electrochromic material is enabled (driven by an applied voltage), it can control the optical properties such as optical transmission, absorption, reflectance, and/or emittance in a continual but reversible manner so that the blue light radiation can be selectively absorbed and/or reflected, achieving a purpose of blocking the blue light radiation.

Referring to FIG. 1A, the processor 11 includes a current-voltage converter 121, an accumulator 122, and an analyzer 123. The current-voltage converter 121 is configured to convert the photo current to a radiation voltage. The accumulator 122 is configured to process the radiation voltage collected over a predetermined time interval in a cumulative calculation process to obtain a cumulative radiation intensity. Optionally, the accumulator is a register in which intermediate arithmetic and logic results of the cumulative calculation are stored. A timer or a counter is coupled directly with the accumulator and is configured to reset the starting time point, and count the time to the preset time interval, depending on data bits (in this case how fast the radiation voltage is converted from the detected photo current originated from the blue light radiation). The analyzer 123 is configured to analyze the result and determine if the cumulative radiation intensity exceeds a threshold value, e.g., corresponding to a radiation intensity harmful to human eyes. In some embodiments, analyzer 123 contains one or more computing programs embedded in the processor. Optionally, the processor 12 also includes an amplifier 124 configured to amplify the detected photo current prior to converting the amplified current to the radiation voltage using the current-voltage converter 121.

Referring to FIG. 1B, the processor 11 further includes an accumulator 122 and an analyzer 123. The accumulator 122 is configured to process the radiation voltage collected over a predetermined time interval in a cumulative calculation process to obtain a cumulative radiation intensity. Optionally, the accumulator is a register in which intermediate arithmetic and logic results of the cumulative calculation are stored. A timer or a counter is coupled directly with the accumulator and is configured to reset the starting time point, and count the time to the preset time interval, depending on data hits. The analyzer 123 is configured to analyze the result and determine if the cumulative radiation intensity exceeds a threshold value, e.g., corresponding to a radiation intensity harmful to human eyes. In some embodiments, analyzer 123 contains one or more computing programs embedded in the processor.

Figure 2:
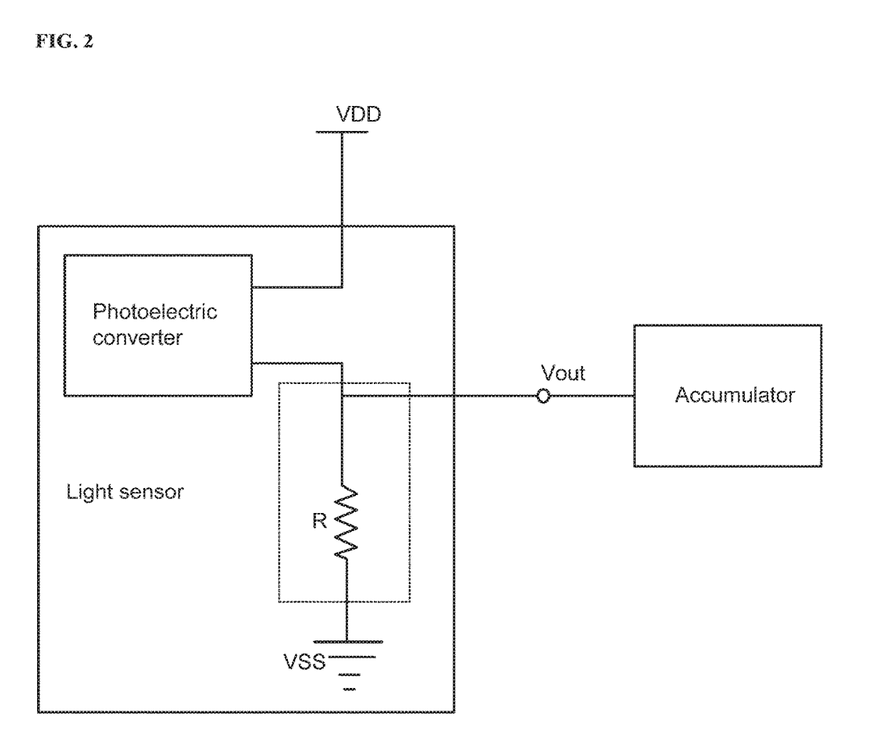
FIG. 2 is a simplified circuit diagram of a voltage accumulator and a light sensor in FIG. 1A and FIG. 1B according to an embodiment of the present disclosure.

FIG. 2 is a simplified circuit diagram of a light sensor in FIG. 1A according to an embodiment of the present disclosure. Referring to FIG. 2, the light sensor includes a photoelectric converter having a first metal electrode connected to a first power supply VDD, and a second metal electrode connects to a second power supply VSS via a resistor R. The resistor R has one end connected commonly to an output port of the light sensor and the second metal electrode of the light sensor. The first power supply VDD loads a first voltage, e.g., as a logic high level, to the first metal electrode. The second power supply VSS loads a second voltage, e.g., as a logic low level, to the second metal electrode. When the light sensor is illuminated by blue light (e.g., blue light having a wavelength in a range of 400 nm to 500 nm), the light sensor will generate a photo current. An input port of the resistor R is connected to the second metal electrode to receive the photo current. The resistor R is able to convert the photo current into a corresponding voltage which is outputted at the output port in association with a time integral of the photo current received at the input port. Further, the voltage value of the corresponding voltage is forwarded to the accumulator (see, also, 122 in FIG. 1A) where the input quantity is accumulated over a time interval to produce a representative output.

In some embodiments, referring to FIG. 1A and FIG. 1B, the protection apparatus for protecting a user from blue light radiation further includes an alarm 14. The alarm 14 is configured to generate an alarm signal whenever the processor 12 determines that the cumulative radiation intensity detected over a preset time interval exceeds the threshold value. Optionally, the alarm signal is one or more visual and/or audible alerts to human, such as siren or beep sound signal, or flashing light signal. In some implementations of the present disclosure, when the processor 12 determines that the cumulative radiation intensity exceeds the threshold value, it indicates that blue light radiation can cause damage to the eyes of a person exposed thereof. When the processor 12 determines that the cumulative radiation intensity is less than or equal to the threshold value, it indicates that the blue light radiation is not strong enough to cause significant damage to user's eyes. The alarm signal is an alert for the person to take action for avoiding radiation damage. For example, if the person is currently in front of a display apparatus that emits blue light, the person may choose to step away from the display apparatus in response to the alarm signal generated by the alarm of the protection apparatus. The alarm can be disposed in a wearable apparatus incorporating the protection apparatus or disposed next to a display apparatus in association with a monitoring module for monitoring a user within a preset monitoring distance range.

Optionally, the protection apparatus further includes a monitoring module 15 (see FIG. 1A and FIG. 1B) configured to monitor the user and determine if the user leaves a monitoring distance range within a preset time interval after the alarm 14 generates an alarm signal. In some embodiments, the processor 12 determines that the cumulative radiation intensity (over a certain time interval) exceeds the threshold value, and the monitoring module 15 determines that the user does not leave the monitoring distance range within the preset time interval after the alarm signal is generated by the alarm 14, the electrochromic module is operated to enable the protection layer. If the monitoring module 15 determines that the user left the monitoring distance range within the preset time interval after the alarm signal is generated, the protection layer is not enabled by the electrochromic module because the user is no longer subject to the blue light radiation. Optionally, if the monitoring module 15 determines that the user remains inside the monitoring distance range within the preset time interval after the alarm signal is generated by the alarm 14, but the processor 12 determines that the cumulative radiation intensity (over a certain time interval) decreases below the threshold value, the protection layer is not enabled by the electrochromic module.

Optionally, the monitoring module 15 is a human body recognition device or a video camera. For example, if the user is located in a monitoring distance range in front of a display apparatus that emits blue light, the monitoring module 15 is to monitor if the user remains in front of the display apparatus or has left the monitoring distance range. Once the monitoring module 15 detects the user to be in front of the display apparatus, it determines that the user does not leave the monitoring distance range. If the monitoring module detects that the user is not in front of the display apparatus, it determines that the user left the monitoring distance range within the preset time interval.

In some embodiments, the protection layer is characterized by a protection strength which can be defined as a degree of blue light blocking, e.g., a percentage value of blue light radiation being blocked. The protection strength of the protection layer can be adjusted depending on applications. Optionally, the protection apparatus for protecting a user from blue light radiation is wholly or partially incorporated into a wearable apparatus. Such the protection apparatus further includes an angle detector 16 (see FIG. 1A and FIG. 1B) configured to detect angular information of the blue light at any location of the protection layer and corresponding photo current or photo voltage at the location. In particular, it detects an angle of incidence of the blue light received at a location of the protection layer corresponding to a maximum photo current or a maximum photo voltage detected by the radiation detector 11 relative to a surface of the protection layer. For example, the protection layer is a lens (wore by a user) and the angular information is the angle of incidence of the blue light on the lens.

Optionally, the angle detector 16 is a light sensor including at least two separately placed photodiodes. The angle detector 16 is configured to detect angular information of light relative to a location of the protection layer where the corresponding photo current or photo voltage has a maximum value. The angular information includes an angle of incidence or an angle of exit relative to a surface of the protection layer at the location determined by measuring the difference of photo currents or photo voltages detected by two photodiodes. With the angular information obtained by the angle detector 16 and a corresponding voltage value (e.g., the maximum photo voltage or a corresponding voltage converted from the maximum photo current), the processor 12 is able to process data associated with the voltage and the angular information. Specifically, the processor 12 calculates a first factor associated with the voltage and a second factor associated with the angle of incidence. Based on the first factor and the second factor, the processor 12 generates an adjustment value. Optionally, the adjustment value is a product of the first factor associated with the voltage and the second factor associated with the angle. The electrochromic module 13 is configured to adjust the protection strength of the protection layer based on the adjustment value. Optionally, a look-up table can be utilized to provide a correspondence relationship between an adjustment value and a protection strength (e.g., a degree of light blocking). In application, the electrochromic module checks the loop-up table to find the protection strength corresponding to the adjustment value and adjust the protection strength of the protection layer based on the adjustment value obtained in real time.

Optionally, the protection apparatus is a component of a display apparatus (e.g., integrated into or attached to a display apparatus). In some examples, the protection layer (e.g., the electrochromic layer) is a component of a display apparatus (e.g., integrated into or attached to a display apparatus). Such the protection apparatus may further include a location detector 17 and a rangefinder 18. The location detector 17 is configured to detect a location of the protection layer that corresponds to a maximum photo current or the maximum photo voltage. In some embodiments, the protection layer is disposed on a screen of the display apparatus and the location detector 17 is a device having a matrix of light sensors distributed over the entire screen. Optionally, the location detector 17 is capable of reporting sensor signal back to the processor with information of the sensor location associated with a maximum photo current or the maximum photo voltage. In some embodiments, the detected location also is associated with an angular information corresponding to an angle of exit of the blue light out of the screen. The rangefinder 18 is configured to detect a distance between the location on the screen corresponding to the maximum photo current or the maximum photo voltage and the user. Optionally, the rangefinder 18 is a binocular miniature camera capable of measuring the distance.

Processor 12 of the protection apparatus is configured to generate an adjustment value based on the distance and a voltage (e.g., a maximum photo voltage or a voltage converted from the maximum photo current). In particular, the adjustment value is a sum of a first factor associated with the voltage and a second factor associated with the distance. Optionally, the electrochromic module 13 of the protection apparatus uses the adjustment value to adjust the protection strength of the protection layer. Optionally, a look-up table can be utilized to provide a correspondence relationship between an adjustment value and a protection strength. Optionally, the electrochromic module 13 checks the loop-up table to find the protection strength corresponding to the adjustment value and adjust the protection strength of the protection layer based on the adjustment value obtained in real time.

Optionally, the rangefinder 18 also can detect an angle of exit of the blue light out of the screen (of the display apparatus) at the location corresponding to the maximum photo current or the maximum photo voltage converted from the blue light radiation. The maximum photo current is then converted to a corresponding voltage by the current-voltage converter of the protection apparatus. The maximum photo voltage is used directly in downstream processes. The processor 12 generates an adjustment value for adjusting the protection strength of the protection layer based on the voltage value of the corresponding voltage, the angle of exit of the blue light, and the distance between the exit location and the user. In particular, the adjustment value is a sum of a product of a first factor associated with the voltage, a second factor associated with the angle of exit, and a third value associated with the distance.

During the time interval when the protection layer is enabled, the timer of the processor 12 can be reset and the processor 12 can reinitiate a cumulative calculation by processing the radiation voltage collected over a same sampling time interval starting from the time point when the protection layer is enabled. The processor 12 obtains a cumulative radiation intensity from the cumulative calculation and determines if the cumulative radiation intensity exceeds the threshold value of blue light radiation. This is a same process as that described in FIG. 1A and FIG. 1B, but simply started from a new time point after the protection layer is enabled. Once the processor 12 determines that the cumulative radiation intensity over the sampling period is not greater than the threshold value, the electrochromic module 13 is triggered to disable the protection layer. The protection apparatus thus is in a standby mode for saving power.

Figure 3:
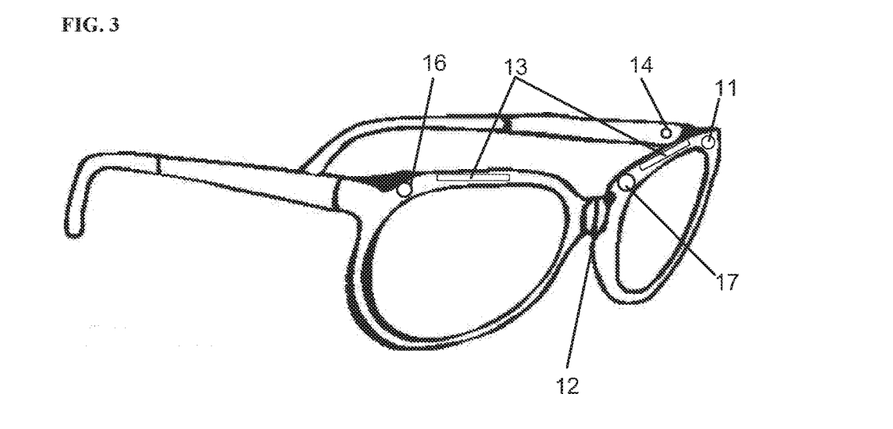
FIG. 3 is a simplified diagram of a wearable apparatus according to another embodiment of the present disclosure.

FIG. 3 is a simplified diagram of a wearable apparatus according to another embodiment of the present disclosure. Referring to FIG. 3, the present disclosure provides a wearable apparatus including the protection apparatus described above in FIG. 1A or FIG. 1B. The wearable apparatus, in this example, is a glasses wearable by a person. In particular, the protection layer of the protection apparatus is implemented as a pair of lenses made by electrochromic material or an electrochromic coating layer over the lenses. Whenever the radiation detector of the protection apparatus on the glasses detects a photo current or a photo voltage from blue light, the processor performs cumulative calculation to obtain a cumulative radiation intensity, and determine if this cumulative radiation intensity exceeds a threshold value. When the cumulative radiation intensity exceeds the threshold value, the electrochromic module controls the protection layer to provide proper protection for the user from the blue light radiation. The alarm may generate an alarm signal to warn the user to leave an area having blue light radiation exceeding the threshold value that may cause eye damage. Optionally, the protection apparatus including a radiation detector 11, a processor 12, an electrochromic module 13, an alarm 14, an angle detector 16, and a rangefinder 17 can be disposed in the frame of the glasses. The electrochromic module 13 is able to apply different bias voltage on the protection layer (e.g., a pair of lenses) to adjust its protection strength. Additionally, a monitoring module (not shown) can be disposed separately from the glasses. For example, the monitoring module is disposed next to a display apparatus which a blue light source. In some embodiments, the protection apparatus can be a single integrated microchip on a system board embedded into the frame of the glasses. All the functional features described above for each individual module of the protection apparatus are applicable to this exemplary wearable apparatus.

In an alternative embodiment, the present disclosure provides a display apparatus including the protection apparatus described above in FIG. 1A or FIG. 1B. In the display apparatus, the protection apparatus can be implemented with all individual modules being integrated or being separately disposed. In particular, the protection layer of the protection apparatus is directly implemented on the screen of the display apparatus. When the display apparatus is in operation, blue light may be emitted through the screen. The radiation detector of the protection apparatus detects photo current or photo voltage at various locations on the screen. The monitoring module monitors user to determine if the user is in a preset monitoring distance range. The processor calculates a cumulative radiation intensity over a predetermined time interval and determines if the cumulative radiation intensity exceeds a threshold value to cause damage to the user who is remained in the monitoring distance range. Optionally, the electrochromic module enables the protection layer to at least partially block the blue light. Optionally, the alarm generates an alarm signal to warn the user to leave the monitoring distance range within a preset time interval to avoid blue light radiation damage.

In another aspect, the present disclosure provides a method of protecting a user's eye from blue light radiation. In some embodiments, the method includes converting blue light from a light source into a photo current or a photo voltage; detecting a photo current or a photo voltage induced by blue light from a light source; optionally converting the photo current into a voltage having a voltage value; calculating a cumulative radiation intensity based on the voltage value (e.g., the voltage value of the detected photo voltage or a voltage converted from the detected photo current) cumulated over a time interval; comparing the cumulative radiation intensity with a threshold value; and adjustably blocking at least a portion of blue light from the user's eye when the cumulative radiation intensity exceeds the threshold value by controlling a degree of blue light blocking of an electrochromic layer between a first light blocking degree and a second light blocking degree.

The first light blocking degree corresponds to a first light blocking state of the electrochromic layer, and the second light blocking state corresponds to a second light blocking state of the electrochromic layer. The electrochromic layer has a higher degree of blue light blocking in the second light blocking state than in the first light blocking state. Optionally, the first light blocking state is a state in which no voltage signal is applied to the electrochromic layer. Optionally, the first light blocking state is a state in which the blue light is substantially not blocked by the electrochromic layer. Optionally, the second light blocking degree is the maximum light blocking degree that can be achieved in the electrochromic layer. Optionally, the first light blocking state is a state in which a first voltage signal is applied to the electrochromic layer, and the second light blocking state is a state in which a second voltage signal is applied to the electrochromic layer.

In some embodiments, the degree of light blocking of the apparatus is adjustable between the first light blocking degree and the second light blocking degree, e.g., the degree of light blocking of the apparatus may be adjusted to be any value between the first light blocking degree and the second light blocking degree. Optionally, the degree of light blocking of the apparatus may be adjusted to one of a set of preselected light blocking degrees, e.g., one of 2, 5, 10, preselected light blocking degrees.

Figure 4A:
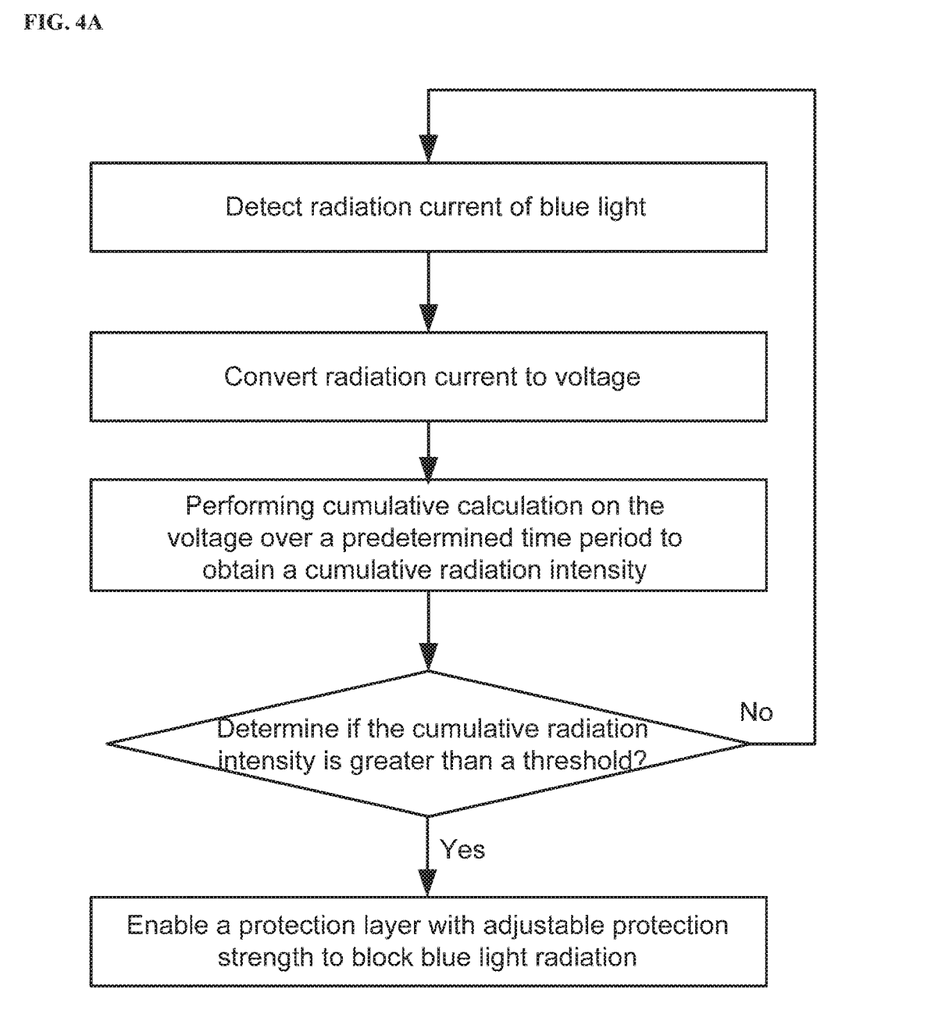
FIG. 4A is a flow chart illustrating a method for protecting a user from blue light radiation according to an embodiment of the present disclosure.
Figure 4B:
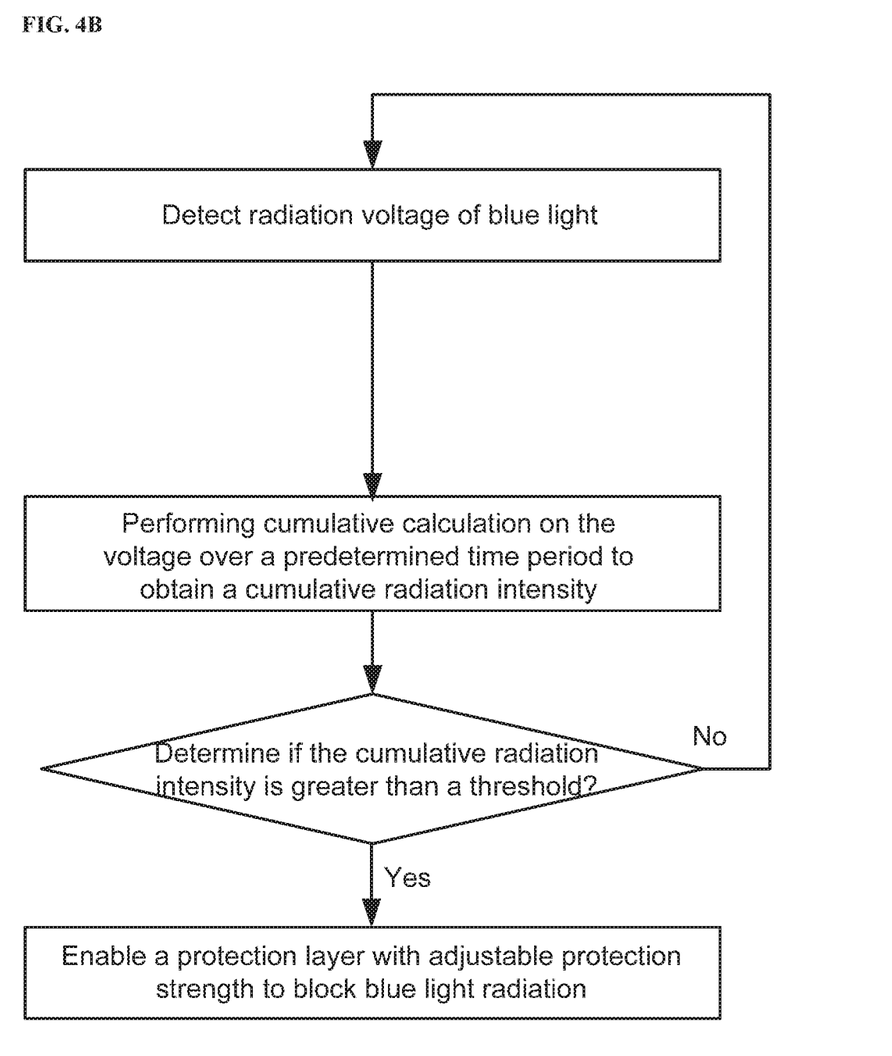
FIG. 4B is a flow chart illustrating a method for protecting a user from blue light radiation according to an embodiment of the present disclosure.

FIG. 4A and FIG. 4B are flow charts illustrating methods for protecting a user from blue light radiation according to some embodiments of the present disclosure. Referring to FIG. 4A and FIG. 4B, the present disclosure provides a method of protecting a user from blue light radiation. The method includes a process of detecting a photo current (FIG. 4A) or a photo voltage (FIG. 4B) of blue light which may come from any light sources such as an illumination light source or a display apparatus. Optionally, the method further includes converting blue light from a light source into the photo current (FIG. 4A). Optionally, the step of converting blue light includes selectively converting blue light having a wavelength in a range of approximately 400 nm to approximately 500 nm into the photo current or the photo voltage, e.g., by a light sensor with its response wavelength being set to a range of 400 nm to 500 nm.

Referring to FIG. 4A, the method optionally includes a process of converting the photo current to a voltage having a voltage value. Referring to FIG. 4A and FIG. 4B, the method then includes a process of calculating a cumulative radiation intensity based on the voltage cumulated over a predetermined time interval and another process of determining if the cumulative radiation intensity exceeds a threshold value. If the cumulative radiation intensity exceeds a threshold value, then the method optionally includes a process of enabling a protection layer to at least partially block the blue light. If the cumulative radiation intensity is determined to be no greater than the threshold value, the method repeats the process of detecting the radiation from the blue light and other processes described above. Optionally, the method shown in the FIG. 4A or FIG. 4B can be implemented using the protection apparatus of FIG. 1A or FIG. 1B described above.

Figure 5A:
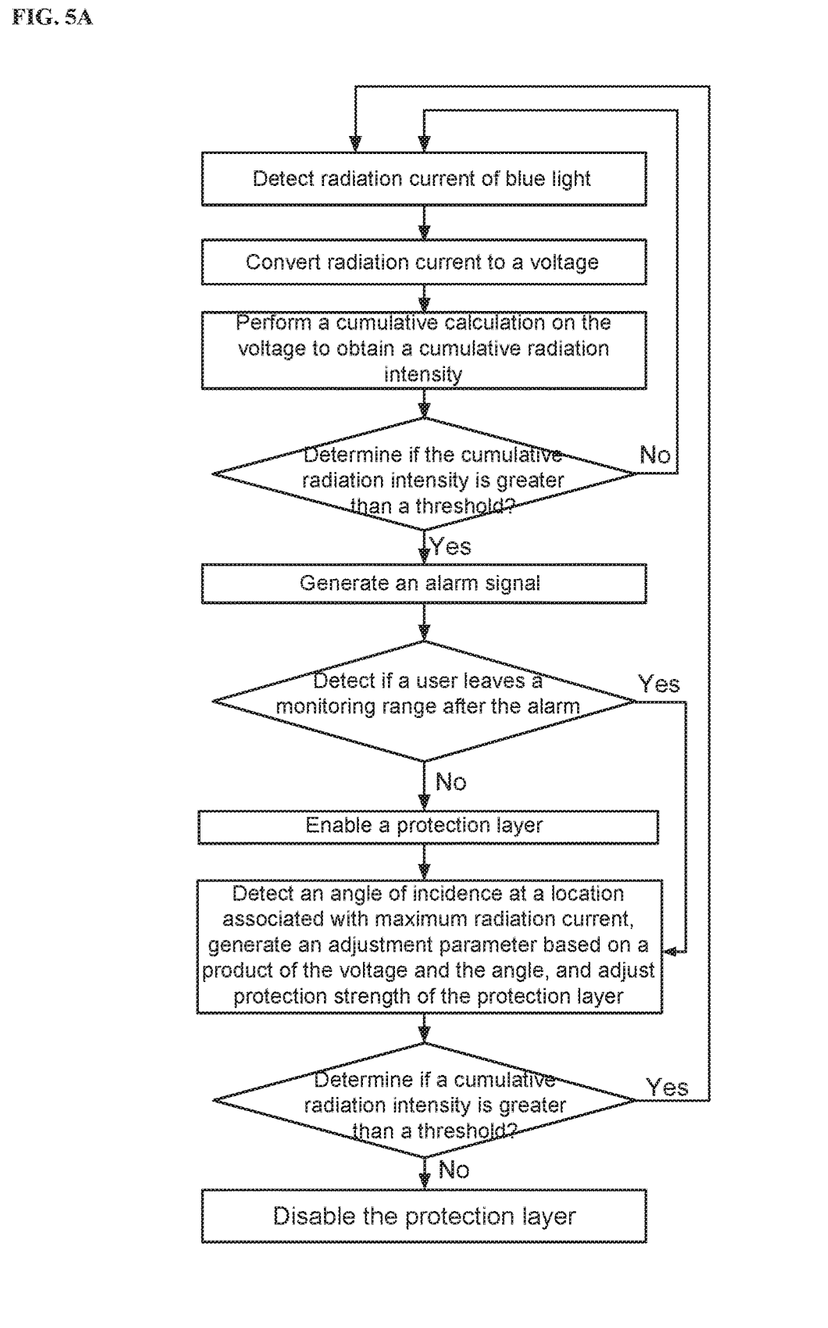
FIG. 5A is a flow chart illustrating a method for protecting a user from blue light radiation according to another embodiment of the present disclosure.
Figure 5B:
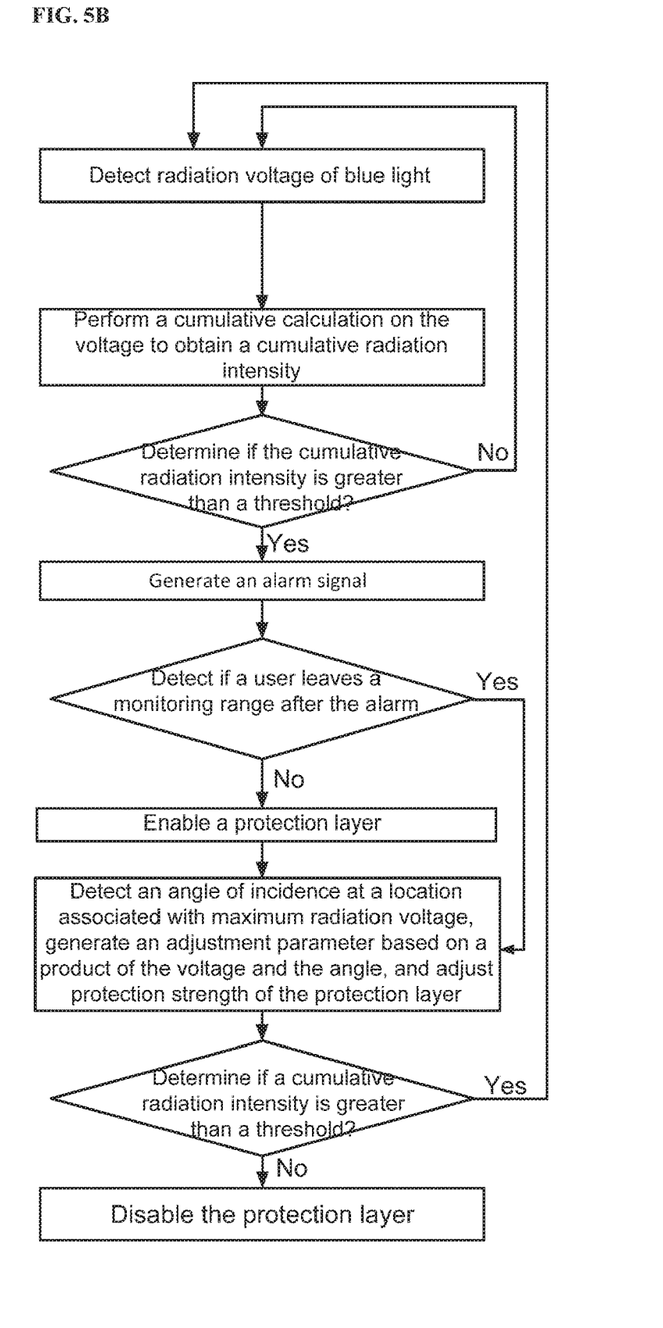
FIG. 5B is a flow chart illustrating a method for protecting a user from blue light radiation according to another embodiment of the present disclosure.

FIG. 5A and FIG. 5B are flow charts illustrating methods for protecting a user from blue light radiation according to some embodiments of the present disclosure. Referring to FIG. 5A and FIG. 5B, the method includes a process of detecting a photo current (FIG. 5A) or a photo voltage (FIG. 5B) of blue light which may come from any light sources such as an illumination light source or a display apparatus. Optionally, the method further includes converting blue light from a light source into the photo current (FIG. 5A). Optionally, the step of converting blue light includes selectively converting blue light having a wavelength in a range of approximately 400 nm to approximately 500 nm into the photo current or the photo voltage, e.g., by a light sensor with its response wavelength being set to a range of 400 nm to 500 mm.

Further, the method of FIG. 5A includes a process of converting the photo current to a voltage. Referring to FIG. 5A and FIG. 5B, the method then includes a process of calculating a cumulative radiation intensity based on a voltage value (e.g., the voltage value of the detected photo voltage or the voltage value of the voltage converted from the photo current) cumulated over a predetermined time interval and another process of determining if the cumulative radiation intensity exceeds a threshold value. If the cumulative radiation intensity exceeds the threshold value, then the method includes a process of generating an alarm signal by an alarm. If the cumulative radiation intensity is determined to be no greater than the threshold value, the method keeps on its process of detecting the radiation from the blue light and other processes described above. The method shown in the FIG. 5A and FIG. 5B can be implemented using the protection apparatus of FIG. 1A or FIG. 1B described above.

Additionally, the method of FIG. 5A or FIG. 5B includes a process of, within a preset time interval after the alarm signal is generated in a previous process, monitoring the user by a monitoring module in the protection apparatus and determining if the user leaves the monitoring distance range. If the user is determined to remain in the monitoring distance range after the preset time interval, the method optionally includes a process of enabling a protection layer to at least partially block the blue light. If the monitoring module determines that the user has left the monitoring distance range within the preset time interval after the alarm signal is generated, the method optionally includes detecting an angle of blue light incidence/exit relative to a surface of the protection layer at a location of the protection layer where a maximum photo current or a maximum photo voltage is correspondingly detected by the radiation detector of the protection apparatus. Optionally, a corresponding voltage having a corresponding voltage value is obtained by converting the maximum photo current (FIG. 5A). Further, the method includes a process of detecting a distance value between the location and the user. Furthermore, the method includes a process of generating an adjustment value based on the voltage value (e.g., the voltage value of the maximum photo voltage or the voltage value of the voltage converted from the maximum photo current) and the distance value. Moreover, the method includes a process of adjusting protection strength of the protection layer using the adjustment value.

In addition, the method of FIG. 5A or FIG. 5B includes a process of, during the time interval that the protection layer has been enabled, calculating a cumulative radiation intensity over a predetermined time interval on the photo current or on the voltage converted from the detected photo current from the blue light. The radiation detector of the protection apparatus continues its operation to detect the radiation from blue light no matter the protection layer is enabled or not. Yet, the cumulative calculation is restarted after the protection layer is enabled as a timer has been reset thereafter. Optionally, the method further includes a process of determining if the cumulative radiation intensity obtained after the protection layer is enabled exceeds the threshold value. If the cumulative radiation intensity obtained in a new sampling period after the protection layer is enabled is determined to exceed the threshold value, the method keeps enabling the protection layer while continuing radiation detection and performing cumulative calculation to obtain a cumulative radiation intensity in a next sampling period. If this cumulative radiation intensity obtained in a new sampling period after the protection layer is enabled is determined to be no greater than the threshold value, the method then executes a process of disabling the protection layer as the blue light radiation at this time is considered to no harm to the user.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An apparatus for protecting a user's eye from blue light radiation, comprising:
    a radiation detector configured to convert blue light from a light source into a photo voltage having a voltage value;
    a processor coupled to the radiation detector and configured to calculate a cumulative radiation intensity based on the voltage value cumulated over a time interval, and to compare the cumulative radiation intensity with a threshold value;
    an electrochromic layer configured to adjustably block at least a portion of blue light from the user's eye when the cumulative radiation intensity exceeds the threshold value; and
    a controller coupled to the processor and the electrochromic layer, configured to adjustably control blocking of at least a portion of blue light from the user's eye when the cumulative radiation intensity exceeds the threshold value, and configured to adjustably control a degree of blue light blocking of the electrochromic layer between a first light blocking degree, and a second light blocking degree higher than the first light blocking degree;
    wherein the processor is configured to generate an adjustment value; and
    the controller is configured to adjust the degree of blue light blocking of the electrochromic layer based on the adjustment value;
    wherein the adjustment value is generated based on at least one of:
    (1) a product of a first factor associated with an angle of incidence of the blue light received at a location of the electrochromic layer corresponding to a maximum photo voltage detected by the radiation detector, and a second factor associated with a voltage value of the maximum photo voltage;
    (2) a sum of the second factor, and a third factor associated with a distance between the user and a location of the electrochromic layer corresponding to the maximum photo voltage detected by the radiation detector; or
    (3) a sum of (a) the third factor, and (b) a product of the second factor, and a fourth factor associated with an angle of exit of the blue light at the location of the electrochromic layer corresponding to the maximum photo voltage.

2. The apparatus of claim 1, wherein the processor comprises:
    an accumulator configured to perform cumulative processing of the voltage value over the time interval;
    a calculator configured to calculate the cumulative radiation intensity based on the voltage value cumulated over the time interval; and a comparator configured to compare the cumulative radiation intensity with the threshold value.

3. The apparatus of claim 1, further comprising an alarm configured to generate an alarm signal when the cumulative radiation intensity increases from a first value to a second value, wherein the second value is greater than the threshold value and the first value is less than or equal to the threshold value.

4. The apparatus of claim 3, further comprising a monitor configured to determine if the user is within a distance relative to the light source when a time period starting from a time point when the alarm signal is generated lapses;
wherein the degree of blue light blocking of the electrochromic layer is controlled to be greater than the first light blocking degree if the user is within the distance when the time period lapses.

5. The apparatus of claim 1, further comprising an angle detector;
wherein the apparatus is an eye wearable apparatus wearable on an eye region of a user; and
the angle detector is configured to detect the angle of incidence of the blue light received at the location of the electrochromic layer corresponding to the maximum photo voltage detected by the radiation detector.

6. The apparatus of claim 1, further comprising a location detector and a rangefinder;
wherein the electrochromic layer is a component of a display apparatus;
the location detector is configured to detect the location of the electrochromic layer corresponding to the maximum photo voltage detected by the radiation detector; and
the rangefinder is configured to detect the distance between the location and the user.

7. The apparatus of claim 1, further comprising a location detector and a rangefinder;
wherein the electrochromic layer is a component of a display apparatus;
the location detector is configured to detect the location of the electrochromic layer corresponding to the maximum photo voltage detected by the radiation detector and detect the angle of exit of the blue light at the location of the electrochromic layer corresponding to the maximum photo voltage; and
the rangefinder is configured to detect the distance from the location to the user.

8. The apparatus of claim 1, wherein the electrochromic layer is controlled to have the first light blocking degree when the cumulative radiation intensity decreases from a second value to a first value, wherein the second value is smaller than or equal to the threshold value.

9. The apparatus of claim 1, wherein the first light blocking degree corresponds to a state of the electrochromic layer in which no voltage is applied to the electrochromic layer.

10. A wearable apparatus, comprising the apparatus of claim 1.

11. A display apparatus comprising the apparatus of claim 1.

12. A method of protecting a user's eye from blue light radiation, comprising:
converting blue light from a light source into a photo voltage having a voltage value;
calculating a cumulative radiation intensity based on the voltage value cumulated over a time interval;
comparing the cumulative radiation intensity with a threshold value; and
adjustably blocking at least a portion of blue light from the user's eye when the cumulative radiation intensity exceeds the threshold value, wherein adjustably blocking at least a portion of blue light is performed by controlling a degree of blue light blocking of an electrochromic layer between a first light blocking degree and a second light blocking degree;
determining a location of the electrochromic layer corresponding to a maximum photo voltage;
generating an adjustment value; and
adjusting a degree of blue light blocking based on the adjustment value;
wherein the adjustment value is generated based on at least one of:
(1) a product of a first factor associated with an angle of incidence of the blue light received at a location of the electrochromic layer corresponding to a maximum photo voltage, and a second factor associated with a voltage value of the maximum photo voltage;
(2) a sum of the second factor, and a third factor associated with a distance between the user and a location of the electrochromic layer corresponding to the maximum photo voltage; or
(3) a sum of (a) the third factor, and (b) a product of the second factor, and a fourth factor associated with an angle of exit of the blue light at the location of the electrochromic layer corresponding to the maximum photo voltage.

13. The method of claim 12, further comprising generating an alarm signal when the cumulative radiation intensity increases from a first value to a second value, wherein the second value is greater than the threshold value and the first value is less than or equal to the threshold value.

14. The method of claim 13, further comprising determining if the user is within a distance relative to the light source when a time period starting from a time point when the alarm signal is generated lapses; and blocking at least a portion of blue light from the user's eye if the user is within the distance when the time period lapses.

15. The method of claim 12, wherein the step of converting blue light is performed in an eye wearable apparatus having the electrochromic layer as a component; the method further comprising:
determining the location of the electrochromic layer corresponding to the maximum photo voltage; and
detecting the angle of incidence of the blue light received at the location.

16. The method of claim 12, wherein the step of converting blue light is performed in a display apparatus having the electrochromic layer as a component; the method further comprising:
determining the location of the electrochromic layer corresponding to the maximum photo voltage; and
detecting the distance between the location and the user.

17. The method of claim 12, wherein the step of converting blue light is performed in a display apparatus having the electrochromic layer as a component; the method further comprising:
determining the location of the electrochromic layer corresponding to the maximum photo voltage;
detecting the angle of exit of the blue light at the location of the electrochromic layer corresponding to the maximum photo voltage; and
detecting the distance between the location and the user.

18. The method of claim 12, further comprising:
controlling the electrochromic layer to have the first light blocking degree when the cumulative radiation intensity decreases from a second value to a first value, wherein the second value is smaller than or equal to the threshold value.

* * * * *